(12) United States Patent
Kamida

(10) Patent No.: US 6,460,929 B2
(45) Date of Patent: Oct. 8, 2002

(54) STORABLE/SLIDABLE SEAT APPARATUS FOR VEHICLES

(75) Inventor: Koji Kamida, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/837,356

(22) Filed: Apr. 18, 2001

(65) Prior Publication Data

US 2002/0043848 A1 Apr. 18, 2002

(30) Foreign Application Priority Data

May 16, 2000 (JP) ........................................ 2000-143802

(51) Int. Cl.⁷ ........................ A47C 1/126; B60N 2/04; B60N 2/12
(52) U.S. Cl. ..................... 297/344.1; 297/14; 297/335; 296/65.11; 296/65.13
(58) Field of Search ............................... 297/14, 344.1, 297/331, 335, 337; 296/65.11, 65.13, 65.01, 65.05, 65.09, 65.12

(56) References Cited

U.S. PATENT DOCUMENTS

| | | |
|---|---|---|
| 1,005,080 A | 10/1911 | Storm |
| 1,747,717 A | 2/1930 | Hummert |
| 4,565,344 A | 1/1986 | Iwami |
| 5,632,521 A * | 5/1997 | Archambault et al. ... 297/344.1 |
| 5,797,649 A | 8/1998 | Snell, Jr. et al. |
| 5,984,397 A | 11/1999 | Dawson et al. |
| 6,231,103 B1 | 5/2001 | Elson et al. |

FOREIGN PATENT DOCUMENTS

| | | |
|---|---|---|
| GB | 243121 | 11/1925 |
| GB | 2 279 556 A | 1/1995 |
| JP | 61-81829 | 4/1986 |
| JP | 10264692 | 10/1998 |

* cited by examiner

Primary Examiner—Anthony D. Barfield
(74) Attorney, Agent, or Firm—Merchant & Gould, P.C.

(57) ABSTRACT

Storable/slidable vehicular seat apparatus includes a seat with a seat base that can be flipped upwardly via a pivot to be stored against a wall of a vehicle compartment. The seat base is slidable in a front-and-rear direction of a vehicle bodywork. The seat base is pivotally attached at its one side to the vehicle bodywork. Leg member is secured to the underside of the seat base via a second slider and second sliding rail. When the seat base is flipped upwardly via the pivot, the leg member, second slider and second sliding rail are moved upwardly and stored together with the seat base.

6 Claims, 12 Drawing Sheets

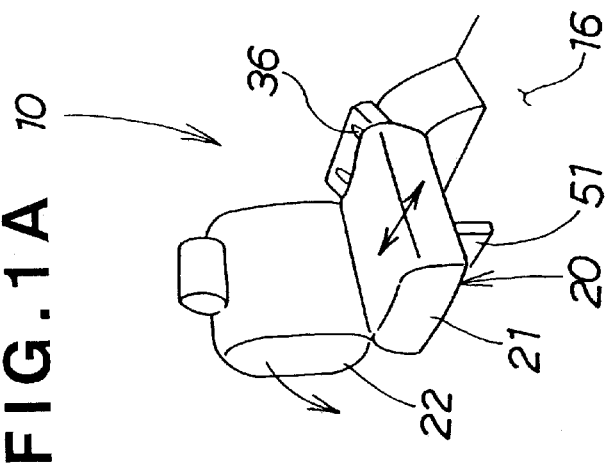
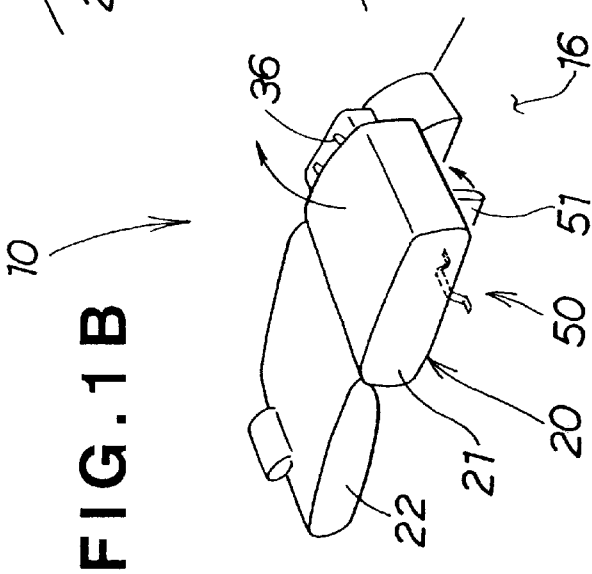
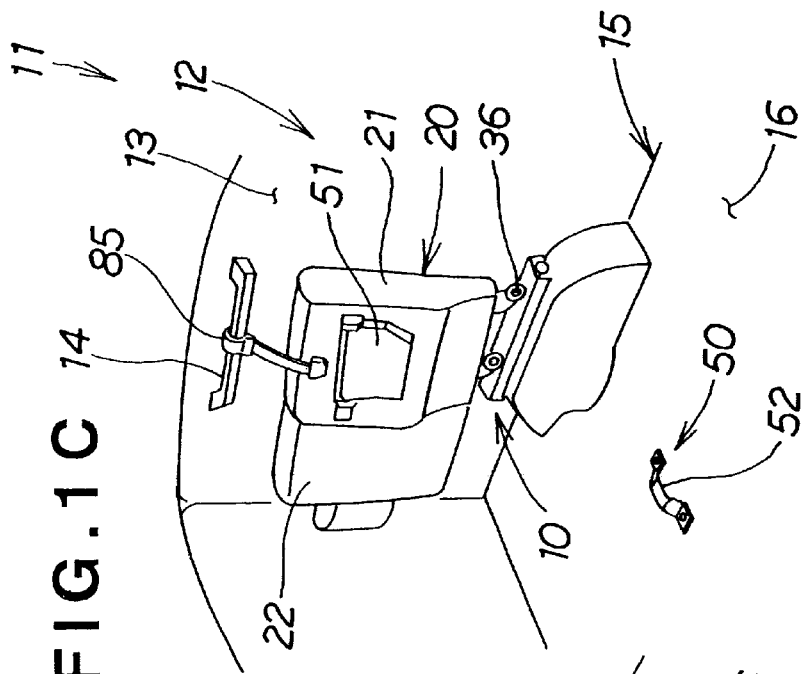

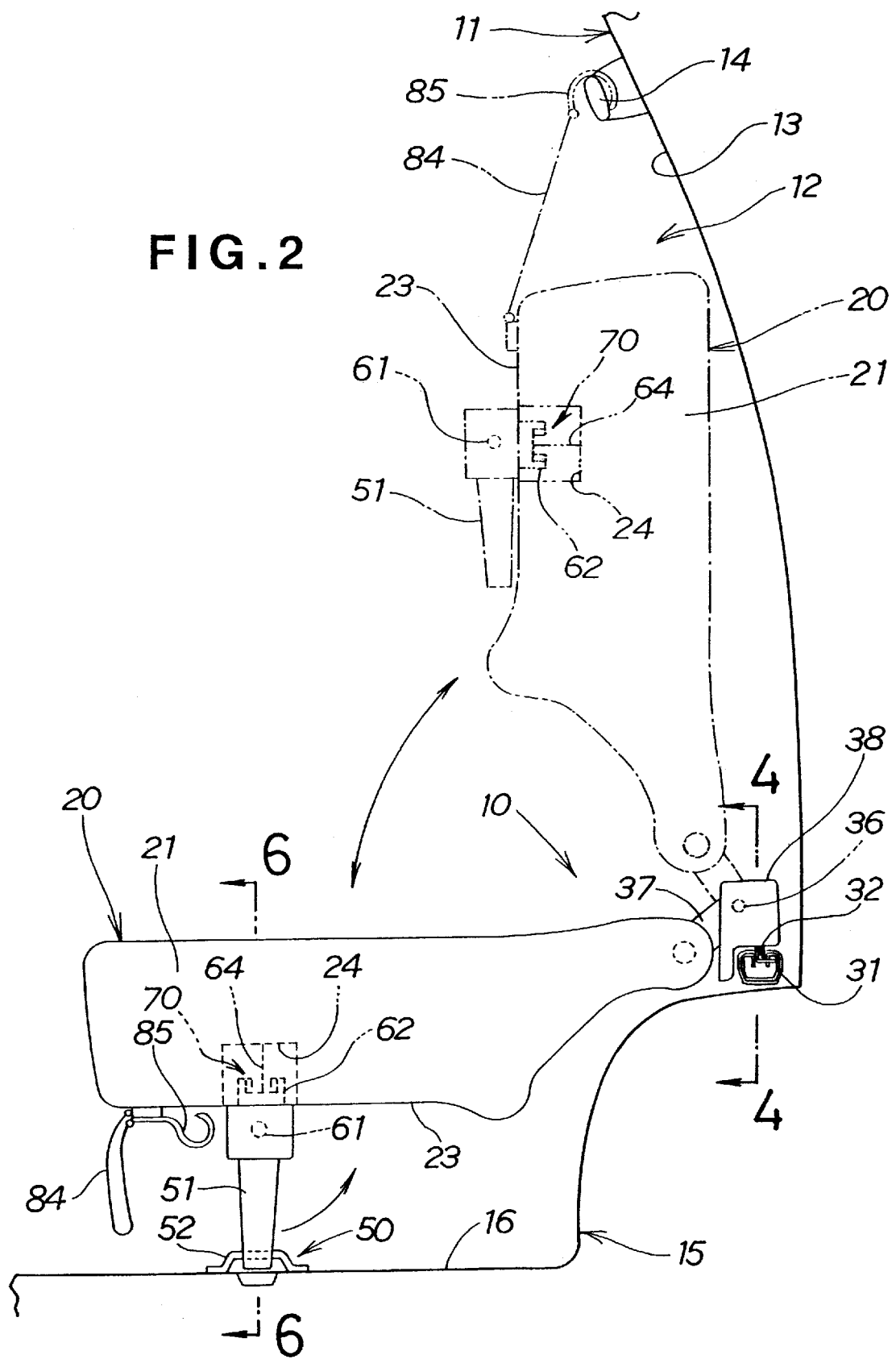

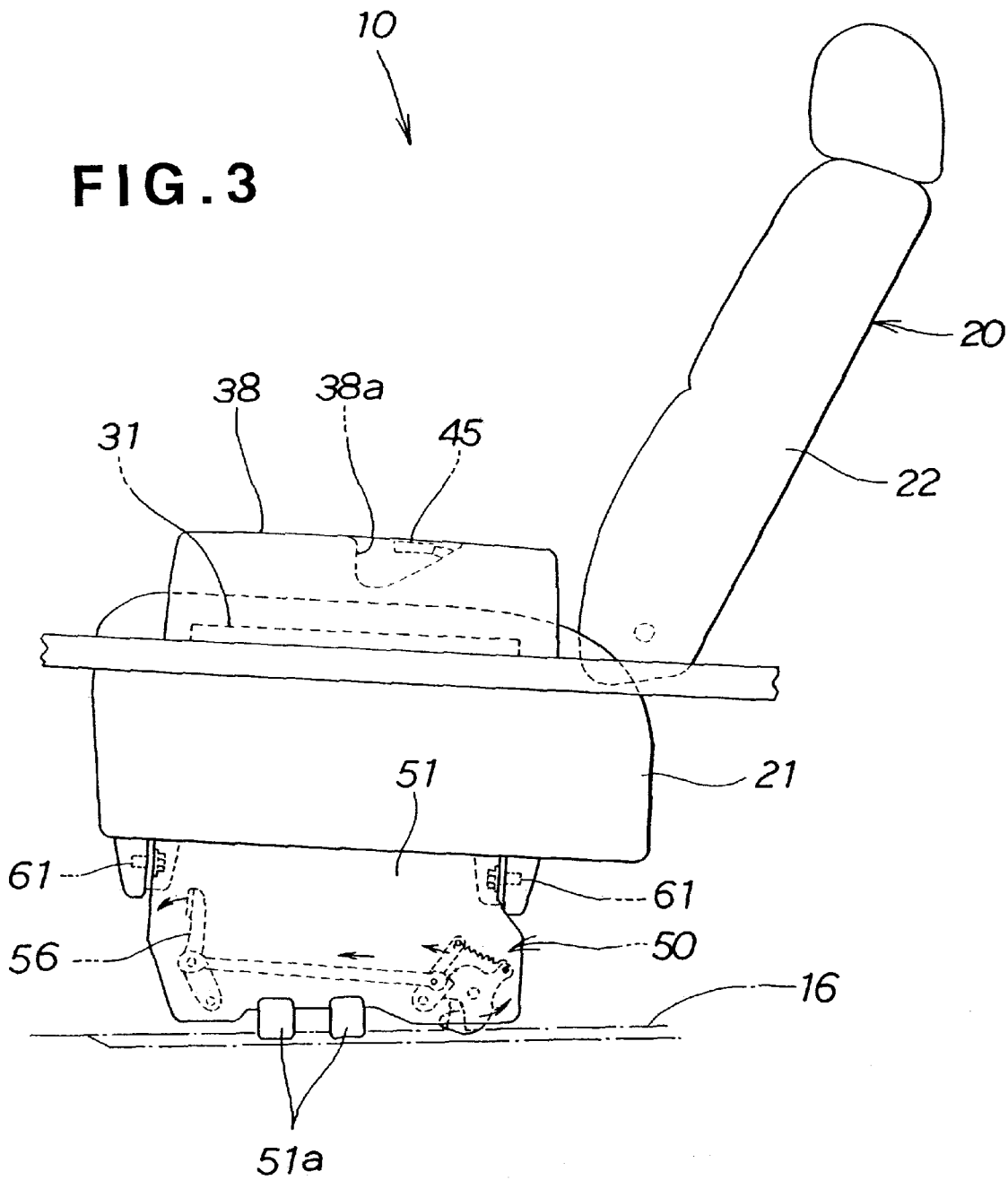

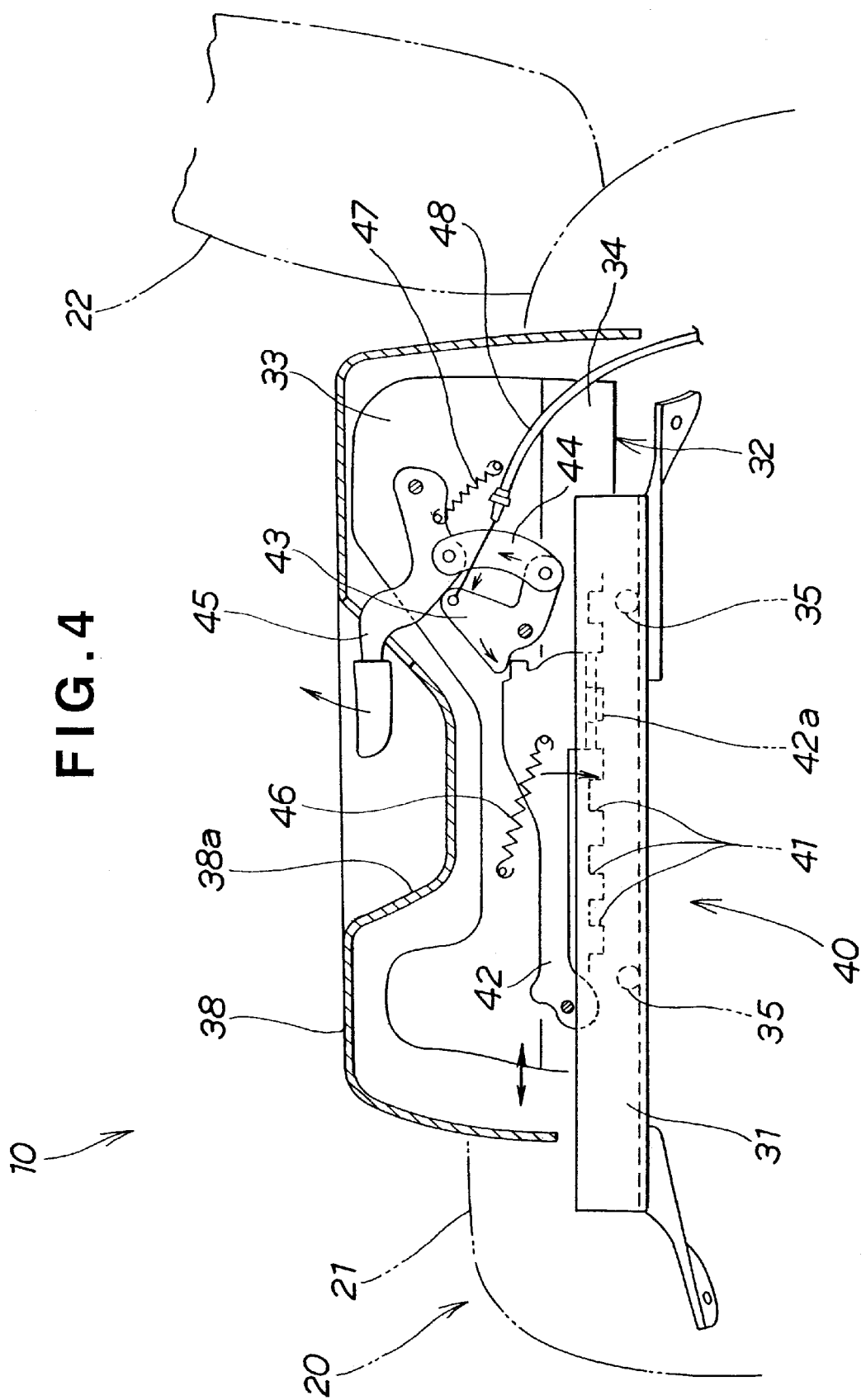

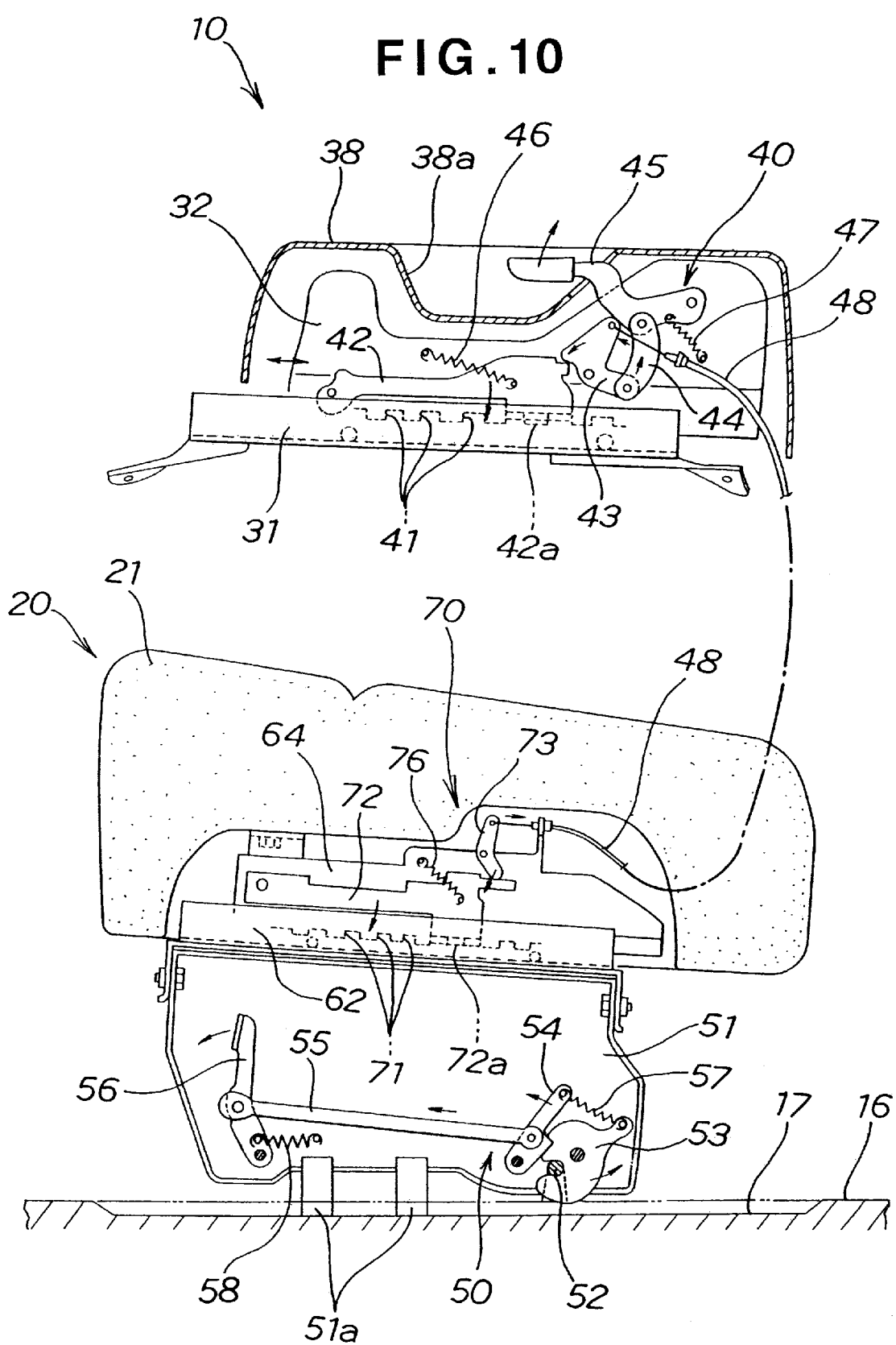

STORABLE/SLIDABLE SEAT APPARATUS FOR VEHICLES

BACKGROUND OF THE INVENTION

1. Field of the Invention

The present invention relates to an improvement over storable/slidable seat apparatus for automotive vehicles.

2. Description of the Related Art

Generally, with automotive vehicles, such as station wagons of a type having no partition between the cabin and the trunk or of another type having the engine provided beneath the driver's compartment or vehicle compartment, there has been a demand for increasing the rear luggage storage space as much as possible. To meet such a demand for the largest possible luggage storage space, various techniques have heretofore been proposed which are designed to allow a rear seat (second- or third-row seat) to be pivotally flipped upwardly to be stored against a side wall defining the vehicle compartment. Examples of these various proposed techniques include a "laterally storable and slidable seat apparatus" (literally translated) disclosed in Japanese Patent Laid-open Publication No. HEI-10-264692.

The disclosed seat apparatus includes a first sliding rail disposed on a raised floor portion proximate to a side wall of the vehicle bodywork, and a second sliding rail disposed on a central floor portion lower in level than the raised floor portion, with a seat base (normally, a seat cushion) being mounted on these first and second sliding rails for sliding movement in a front-and-rear direction of the vehicle. Specifically, the seat base is mounted on the second sliding rail via a catcher attached to the second sliding rail and a striker attached to the seat base. The catcher and striker are releasably engageable with each other. The seat base is mounted on the first sliding rail in such a manner that it is pivotable about a horizontal rotation shaft. When not necessary, the seat base can be flipped upwardly to an upright stored position against a side wall of the vehicle bodywork, by pivotal movement about the horizontal rotation shaft.

More specifically, by canceling the engagement between the striker and the catcher, the seat base and second sliding rail can be disengaged from each other, so that the seat base can be flipped upwardly about the rotation shaft to be stored against the side wall as noted above. After the lift-up of the seat base into the stored position, the second sliding rail is left exposed on the floor.

In the prior art storable/slidable seat apparatus like the one disclosed in Japanese Patent Laid-open Publication No. HEI-10-264692, the second sliding rail, thus left on the floor after the lift-up of the seat base, results in relatively large projections and depressions on the upper surface of the vehicle floor. Such projections and depressions on the vehicle floor tend to interfere with loading or unloading of goods into or from the vehicle compartment, and thus some improvement must be made to increase or maximize the available space of the vehicle compartment.

SUMMARY OF THE INVENTION

It is accordingly an object of the present invention to provide a storable/slidable seat apparatus for a vehicle which can maximize an available space of a vehicle compartment when the seat base is in an upright stored position.

According to an aspect of the present invention, there is provided a storable/slidable seat apparatus for a vehicle, which comprises: a slide mechanism provided on a given portion of a vehicle bodywork proximate to a wall of the vehicle bodywork, the given portion being at a higher level than a central floor portion of the vehicle bodywork, the slide mechanism being slidable in a front-and-rear direction of the vehicle bodywork; a pivot mounted on the slide mechanism; a seat base slidable in the front-and-rear direction of the vehicle bodywork, the seat base being connected to the pivot so that the seat base can be pivotally flipped upwardly and stored against the wall via the pivot; and a leg member attached to an underside of the seat base, and extending downwardly from the underside of the seat base to support the seat base against the floor in such a way that the seat base is slidable relative to the leg member in the front-and-rear direction of the vehicle bodywork.

When the seat base is flipped upwardly to be stored against the wall of the vehicle bodywork defining the vehicle compartment, the leg member slidable relative to the seat base is moved upwardly together with the seat base. At this time, a sliding mechanism, which causes the seat base and leg member to slide relative to each other in the front-and-rear direction is also moved upwardly together with the seat base and leg member; thus, after the flip-up of the seat base to the upright stored position, no sliding mechanism causing the seat base and leg member to slide relative to each other is left on the floor of the vehicle bodywork. This arrangement can eliminate or minimize depressions and projections on the floor after the flip-up of the seat base, which thus allows the available space in the vehicle compartment to be significantly increased or maximized and also facilitates loading or unloading of goods into or from the vehicle compartment.

In a preferred implementation of the invention, the seat base has a recess formed in the underside thereof. Sliding rail, on which the seat base is slidable in the front-and-rear direction, is received in the recess, and the leg member is attached to the sliding rail. With this arrangement, the sliding rail is prevented from projecting from the underside of the seat base into the vehicle compartment when the seat base is flipped upwardly to the upright stored position.

The storable/slidable seat apparatus may further comprise a first slide lock mechanism for controlling sliding movement of the slide mechanism, a second slide lock mechanism for controlling sliding movement of the seat base relative to the leg member in the front-and-rear direction, a slide-lock canceling lever for canceling a locking state of the first and second slide lock mechanism, and a pivot cover covering the pivot and having a depressed portion. The slide-lock canceling lever is provided so that a distal end portion of the slide-lock canceling lever projects only into the depressed portion of the pivot cover. According to the present invention thus arranged, only when a human operator or passenger inserts his or her hand in the upper depressed portion of the pivot cover to thereby intentionally manipulate the slide-lock canceling lever, the locking state of the first and second slide lock mechanisms can be canceled.

Preferably, the seat base has, on the underside, a hook that lockingly engages with a given portion of the wall when the seat base is in the upright stored position. The hook is stored by making use of an empty space beneath the seat base.

BRIEF DESCRIPTION OF THE DRAWINGS

Certain preferred embodiments of the present invention will be described in greater detail below, by way of example only, with reference to the accompanying drawings, in which:

FIGS. 1A to 1C are diagrams explanatory of an exemplary outline of a storable/slidable vehicular seat apparatus in accordance with an embodiment of the present invention;

FIG. 2 is a front view of the storable/slidable vehicular seat apparatus of FIG. 1;

FIG. 3 is a side view of the storable/slidable vehicular seat apparatus shown in FIG. 2;

FIG. 4 is an enlarged fragmentary sectional view taken along the lines 4—4 of FIG. 2;

FIG. 10 is a view showing operational relationship between the first slide lock mechanism and the second slide lock mechanism in the locking state;

DETAILED DESCRIPTION OF THE PREFERRED EMBODIMENTS

Figure 5:
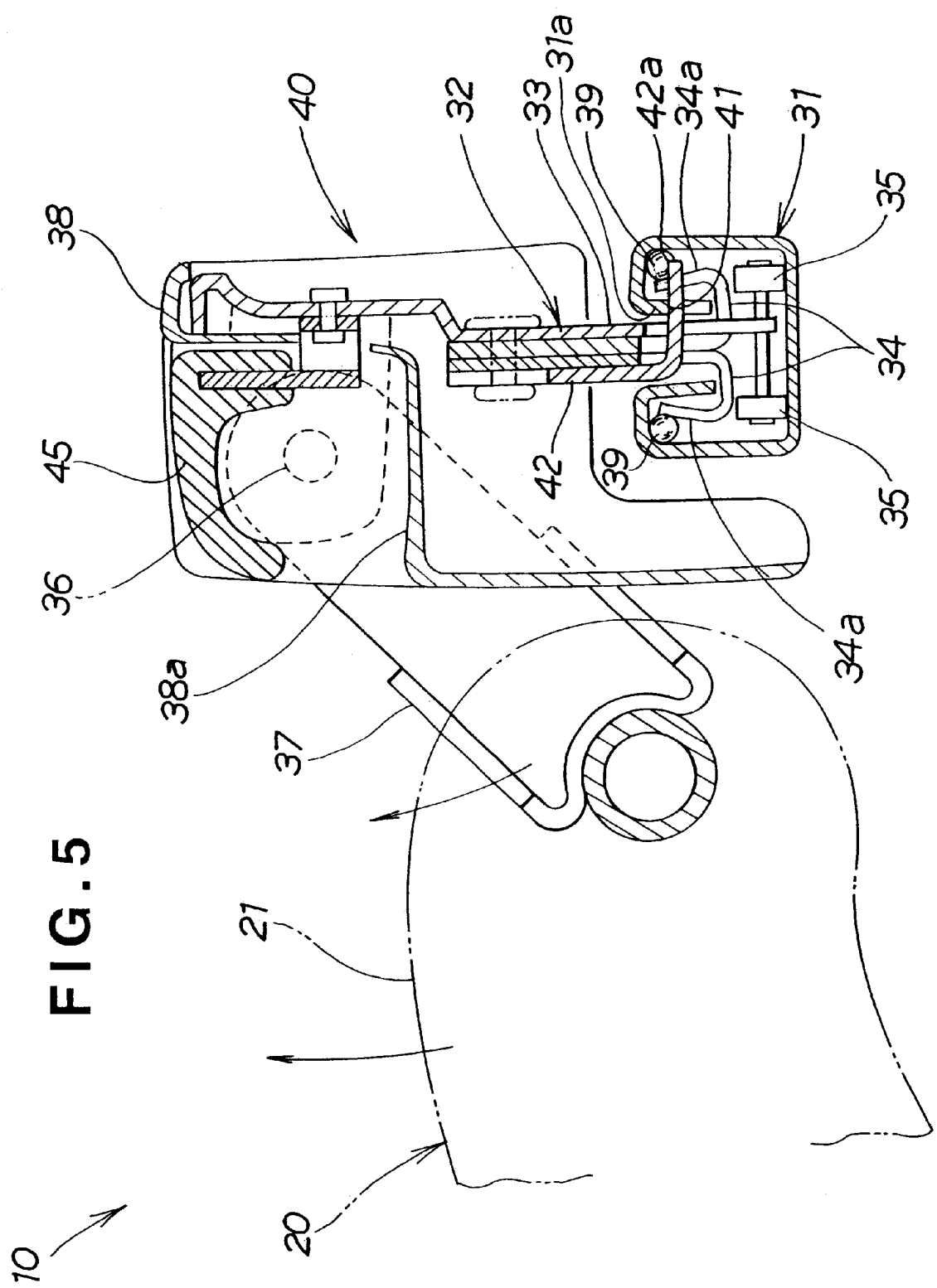
FIG. 5 is an enlarged sectional view showing relationship among a first sliding rail, first slider and first slide lock mechanism of FIG. 4.

The following description is merely exemplary in nature and is in no way intended to limit the invention, its application, or uses.

FIGS. 1A to 1C are diagrams explanatory of an exemplary outline of a storable/slidable vehicular seat apparatus 10 in accordance with an embodiment of the present invention. This storable/slidable vehicular seat apparatus 10 is mounted on an automotive vehicle 11, such as a station wagon, having no partition between the cabin and the trunk room. As seen in FIG. 1A, the storable/slidable vehicular seat apparatus 10 includes a slidable seat 20, which has a seat bottom or base (in this embodiment, seat cushion) 21 slidable in a front-and-rear direction of the vehicle 11 and a seat back 22. The term "seat" 20 as used herein refers to a second-row seat disposed right behind the driver's seat, a third-row or rearmost-row seat in the vehicle 11, or the like. Preferred embodiment of the present invention will be described hereinbelow in relation to the storable/slidable vehicular seat apparatus 10 located on the left side of the vehicle 11 as viewed in a traveling direction of the vehicle 11. Description of the storable/slidable vehicular seat apparatus 10 located on the right side of the vehicle 11 is omitted because the right-side seat apparatus is constructed similarly to the left-side seat apparatus 10 in horizontally symmetric relation thereto.

To move the seat 20 to a predetermined upright stored position, the seat back 22 is first caused to pivot rearwardly from a virtually upright position of FIG. 1A to a virtually horizontal position of FIG. 1B. Then, a seat lock mechanism 50 is placed in a non-locking state. After that, the seat base 21 is caused to pivot or flip, along with the seat back 22, upwardly into the upright stored position against a wall 13 defining a vehicle compartment 12. Then, a hook 85 projecting from the seat base 21 is brought into locking engagement with an assist grip, i.e. hook engaging member, 14 on the wall 13. After the seat base 21 has thus been flipped upwardly to the upright stored position, only a striker 52 of the seat lock mechanism 50 is left on a floor 16 of a vehicle bodywork 15.

Referring now to FIGS. 2 and 3, the floor 16 of the vehicle bodywork 15 has a raised portion proximate to the wall 13, which is at a higher level than a central portion of the floor 16. The raised portion is used, for example, as part of a rear wheel housing.

The sliding seat apparatus 10 includes a first sliding rail 31 that is installed on the upper surface of the raised portion of the floor 16 proximate to the wall 16, and a first slider 32 is mounted on the first sliding rail 31 for sliding movement in the front-and-rear direction. The seat base 21 is connected along its left (right in FIG. 2) side edge to the first slider 32 by means of a first pivot 36, so that the seat base 21 is pivotable between a horizontal or seating position (denoted by solid line in FIG. 2) and the upright stored position (denoted by dot-and-dash line in FIG. 2). The sliding seat apparatus 10 also includes a second sliding rail 62 secured to the upper end of a leg member 51 that is in turn supported, via the seat lock mechanism 50, on the central, i.e. lower-level, portion of the floor 16. Further, the sliding seat apparatus 10 includes a second slider 64 mounted on the second sliding rail 62 for sliding movement in the front-and-rear direction, and this second slider 64 is secured to the underside of the seat base 21.

The seat 20 is supported on the vehicle bodywork 15 by means of the first pivot 36 and leg member 51 disposed on the left and right sides of the seat base 21, and the seat base 21 is slidable relative to the leg member 51 in the front-and-rear direction. When the seat lock mechanism 50 is placed in the non-locking state, the leg member 51 is pivotable about a second pivot 61 from an upright position for supporting the seat base 21 to a collapsed position where it is folded against the underside 23 of the seat base 21. As denoted by the dot-and-dash line in FIG. 2, the seat base 21 is brought to the stored position by being flipped upwardly, about the first pivot 36, against the vehicle side wall 13 and then fixed in the stored position by the hook 85 lockingly engaging with the assist grip 14 on the wall 13.

FIGS. 4 and 5 show a first slide lock mechanism 40 that functions to fix or lock the first slider 32, sliding relative to the first sliding rail 31, at a desired position along the length of the rail 31. As shown, the first slide lock mechanism 40 in the instant embodiment includes a plurality of first locking recesses 41, a first lock arm 42, a first cam 43, a slide-lock canceling lever 45, a first-lock-arm return spring 46, and a slide-lock-canceling-lever return spring 47.

The plurality of first locking recesses 41 are formed in the first sliding rail 31 with predetermined pitches along the length of the sliding rail 31, i.e. along the front-and-rear direction of the vehicle. The first lock arm 42 has a hook-shaped lock claw 42a (FIG. 5) releasably engageable with any desired one of the locking recesses 41, and is connected to the first slider 32 for vertical pivoting movement toward or away from the first sliding rail 31. The first cam 43 is pivotably connected to the first slider 32 in such a manner that it can cancel the locking engagement between the first lock arm 42 and the locking recess 41. The slide-lock canceling lever 45 is pivotably connected to the first slider 32 so that the first cam 43 can be manipulated via a link 44.

As seen in FIG. 5, each of the first locking recesses 41 opens downwardly. The first cam 43 is connected to one end of a wire cable 48 so that a second slide lock mechanism (to be described later) can operate in response to the operation of the first slide lock mechanism 40. The first-lock-arm return spring 46 is a tension spring that normally urges the first lock arm 42 upwardly, i.e. in a direction for keeping the lock claw 42a of the arm 42 in engagement with the first locking recess 41. The slide-lock-canceling-lever return spring 47 is a tension spring that normally urges the slide-lock canceling lever 45 to retain the lever 45 in a locking position.

As also shown in FIG. 5, the first sliding rail 31 has a generally channel-like sectional shape, and has inner lip portions 31a bend downward from an upper wall portion of the rail 31 and terminating halfway toward the bottom of the rail 31. The downwardly-opening first locking recesses 41 are formed in one of the inner lip portion 31a. The first slider 32 includes a slider body 33 generally in the form of a flat plate and having a lower end portion inserted in the inner space of the channel-shaped first sliding rail 31 adjacent one of the inner lip portions 31a, and a pair of left and right elongate slide members 34 that together function as a guide when the slider body 33 slides along the channel-shaped first sliding rail 31.

More specifically, the slider body 33 has, at its bottom, a pair of left and right rollers 35 attached via a not-shown retainer. Load of the first slider 32 is supported by the bottom of the first sliding rail 31 via the left and right rollers 35. A plurality of balls 39 are rollably sandwiched between left and right side walls of the first sliding rail 31 and left and right bent-upward lip portions 34a of the slide members 34.

The slide members 34, extending in the front-and-rear direction of the vehicle, each have a J sectional shape and are attached together in back-to-back relation to each other. The horizontal overlap between the lip portions 31a of the first sliding rail 31 and the lip portions 34a of the slide members 32 can prevent the slide members 34 and hence the first slider 34 from being accidentally slipped off the first sliding rail 31. The claw 42a of the first lock arm 42 is caught in the first locking recess 41 when the first slide lock mechanism 40 is in a normal locking state, but is disengaged from the first locking recess 41 as the first lock arm 42 is caused to pivot downward.

As further shown in FIG. 5, a swing arm 37 is connected between the seat base 21 and the first slide lock mechanism 40, which allows the seat base 21 to pivot between the horizontal or seating position and the upright stored position. The swing arm 37 is connected, at its one end, to the first pivot 36 of the first slider 32 for vertical pivoting movement about the horizontal pivot 36. The swing arm 37 is pivotably connected at the other end to the seat base 21 (denoted by two-dots-and-dash line).

The storable/slidable vehicular seat apparatus 10 also includes a pivot cover 38 for covering the first sliding rail 31, first slider 32, first slide lock mechanism 40 and first pivot 36. The pivot cover 38 has an upper depressed portion 38a where is received the slide-lock canceling lever 45 for canceling the locking state of the first slide lock mechanism 40.

Figure 6:
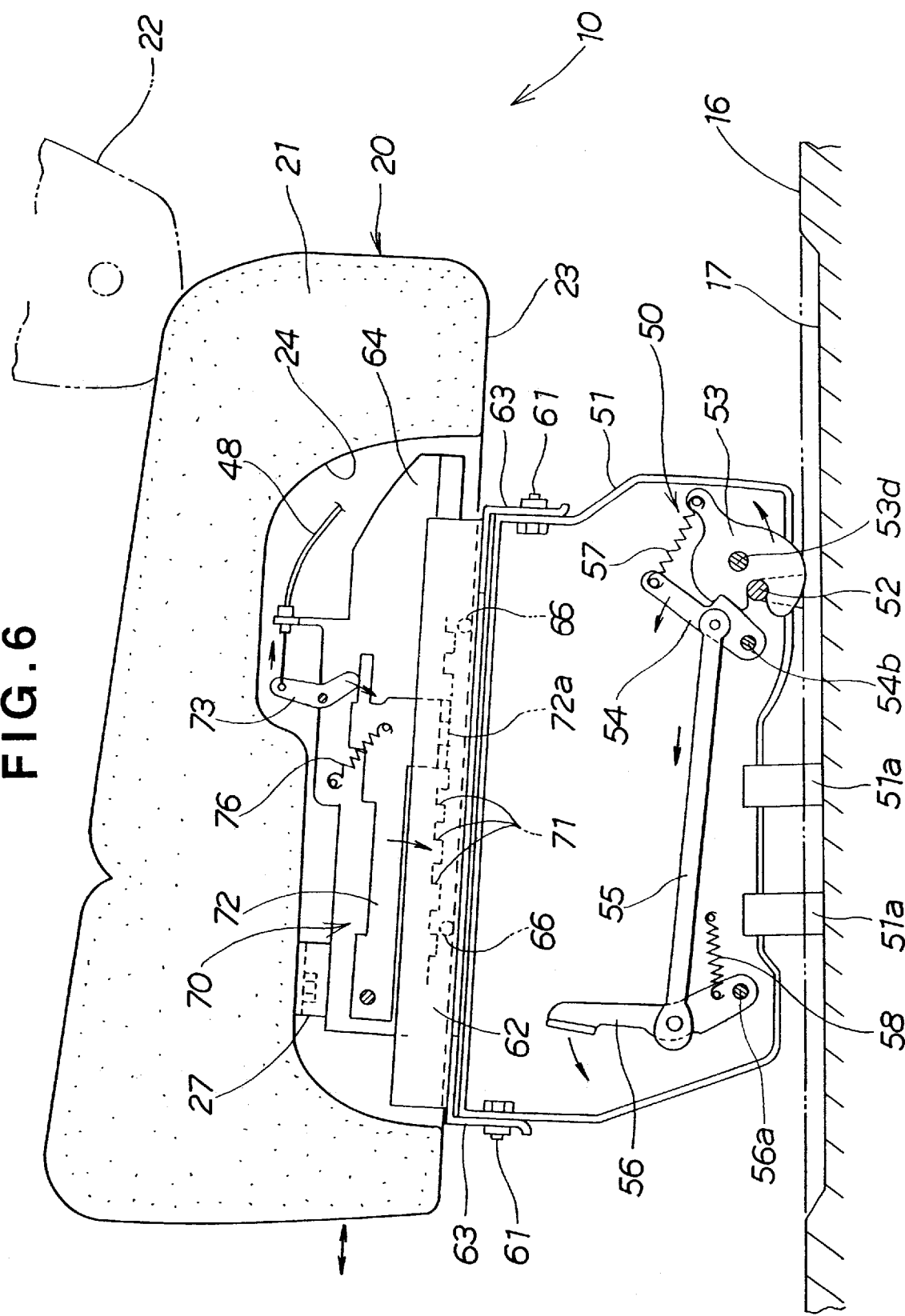
FIG. 6 is an enlarged sectional view taken along the line 6—6 of FIG. 2.

FIG. 6 is an enlarged sectional view taken along the line 6—6 of FIG. 2, which particularly shows the seat lock mechanism 50 functioning to fix the lower end of the leg member 51 relative to the floor 16 as necessary. The seat lock mechanism 50 includes the striker 52 attached to the floor 16, and a catcher (latch) 53 attached to the leg member 51 in such a manner that it is pivotable about a horizontal pivot 53d for lockingly engaging with the striker 52. The seat lock mechanism 50 also includes a lock member 54 also attached to the leg member 51 in such a manner that it is pivotable about a horizontal pivot or support pin 54b, in the front-and-rear direction and normally urged via a catcher return spring 57 for keeping the catcher 53 in the striker-locking state, a seat-lock canceling lever 56 also attached to the leg member 51 for pivoting movement about a horizontal pivot 56a and connected via a link 55 to the lock member 54 for causing the lock member 54 to pivot into or out of engagement with the catcher 53, and a seat-lock-canceling-lever return spring 58.

The leg member 51 has a plurality of rubber pads 51a on a horizontal bottom thereof. Load of the leg member 51 in the upright position is supported on the floor 16 via the rubber pads 51a. The leg member 51 is connected to front and rear brackets 63 of the second sliding rail 62 via second pivots 61 for pivoting movement between the upright and collapsed position. Namely, the leg member 51 is pivotable in the obverse-and-reverse direction of the sheet of FIG. 6.

The seat-lock canceling lever 56 is attached to the leg member 51 for pivoting movement about the horizontal pivot 56a in the front-and-rear direction of the vehicle. The catcher return spring 57 is a tension spring provided between the catcher 53 and the lock member 54 for normally urging the lock member 54 to keep the meshing engagement between the catcher 53 and the lock member 54. The seat-lock-canceling-lever return spring 58 is a tension spring for normally urging the seat-lock canceling lever 56 to be retained in the locking position as shown in FIG. 6.

Referring further to FIG. 6, the second slide lock mechanism 70 is arranged to lock the second slider 64 at an appropriate position along the longitudinal direction of the second sliding rail 62 extending in the front-and-rear direction of the vehicle. The second sliding rail 62 has a plurality of second locking recesses 71 formed therein with predetermined pitches along the length of the rail 62. The second slide lock mechanism 70 includes a second lock arm 72 that is connected to the second slider 64 for vertical pivoting movement about a horizontal pivot and has a hook-shaped lock claw 72a engageable with any desired one of the second locking recesses 71. Second cam 73 is pivotably connected to the second slider 64 in such a manner that it can cancel the locking engagement between the second lock arm 72 and the second locking recess 71. The second cam 73 is connected at its one end to the wire cable 48 for the above-noted purpose. Reference numeral 76 represents a second-lock-arm return spring 76. Namely, the first cam 43 of FIG. 4 and second cam 73 of FIG. 6 are interconnected via the wire cable 48 for an operational linkage therebetween, i.e. between the first and second slide lock mechanisms 40 and 70. Each of the second locking recesses 71 opens downwardly. The second-lock-arm return spring 76 is a tension spring that normally urges the second lock arm 72 upwardly, i.e. in a direction for keeping the lock claw 72a of the arm 72 in engagement with the second locking recess 71.

Figure 7:
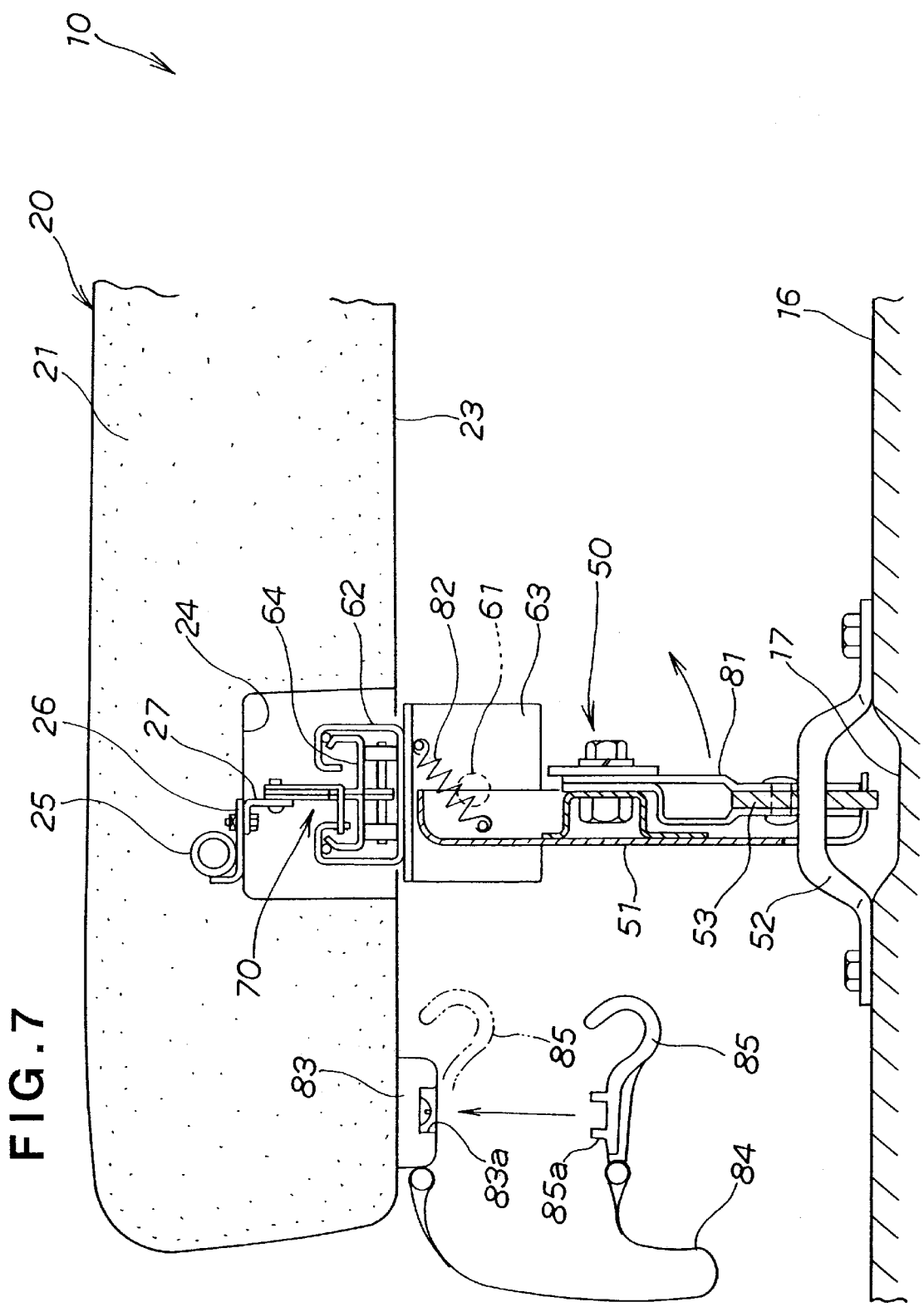
FIG. 7 is an enlarged sectional view showing relationship among a seat lock mechanism, leg member, second sliding rail, second slider and second slide lock mechanism of FIG. 6.

FIG. 7 is an enlarged fragmentary sectional view showing relationship among the seat lock mechanism, leg member, second sliding rail, second slider and second slide lock mechanism of FIG. 6. As seen in FIG. 7, a portion of the vehicle floor 16, where is secured the horizontal striker 52 in the form of a rod having a generally circular sectional shape, has a recess 17, so that a greater gap can be provided between the upper surface of the floor 16 and the striker 52; with this arrangement, the striker 52 projecting upwardly from the floor 16 can be formed into a lower height or lower profile. Further, in FIG. 7, reference numeral 81 represents a catcher-attaching plate, and 82 represents a tension spring for normally urging the leg member 51 toward the collapsed position.

As further shown in FIG. 7, the seat base 21 has a recess 24 formed in the underside thereof, and the second sliding rail 62, second slider 64 and second slide lock mechanism 70 are together received in this underside recess 24 of the seat base 21. The second sliding rail 62 supports the slide base 21 for sliding movement therealong in the front-and-rear direction of the vehicle. The leg member 51 is attached to the second sliding rail 62 via the front and rear flanges 63, as previously noted. Hook mounting member 83 is secured to the underside 23 of the seat base 21. Rope 84 is fastened at its one end to the hook mounting member 83, and the hook 85 is secured to the other end of the rope 84. The hook 85 is retained on the underside 23 of the seat base 21 with an attachment piece 85a of the hook 85 snap-fitted in a retaining hole 83a of the hook mounting member 83. The hook 85 is used for releasably attaching the seat base 21, having been collapsed to the upright stored position, to the assist grip 14 on the wall 13 of the vehicle bodywork.

Figure 8:
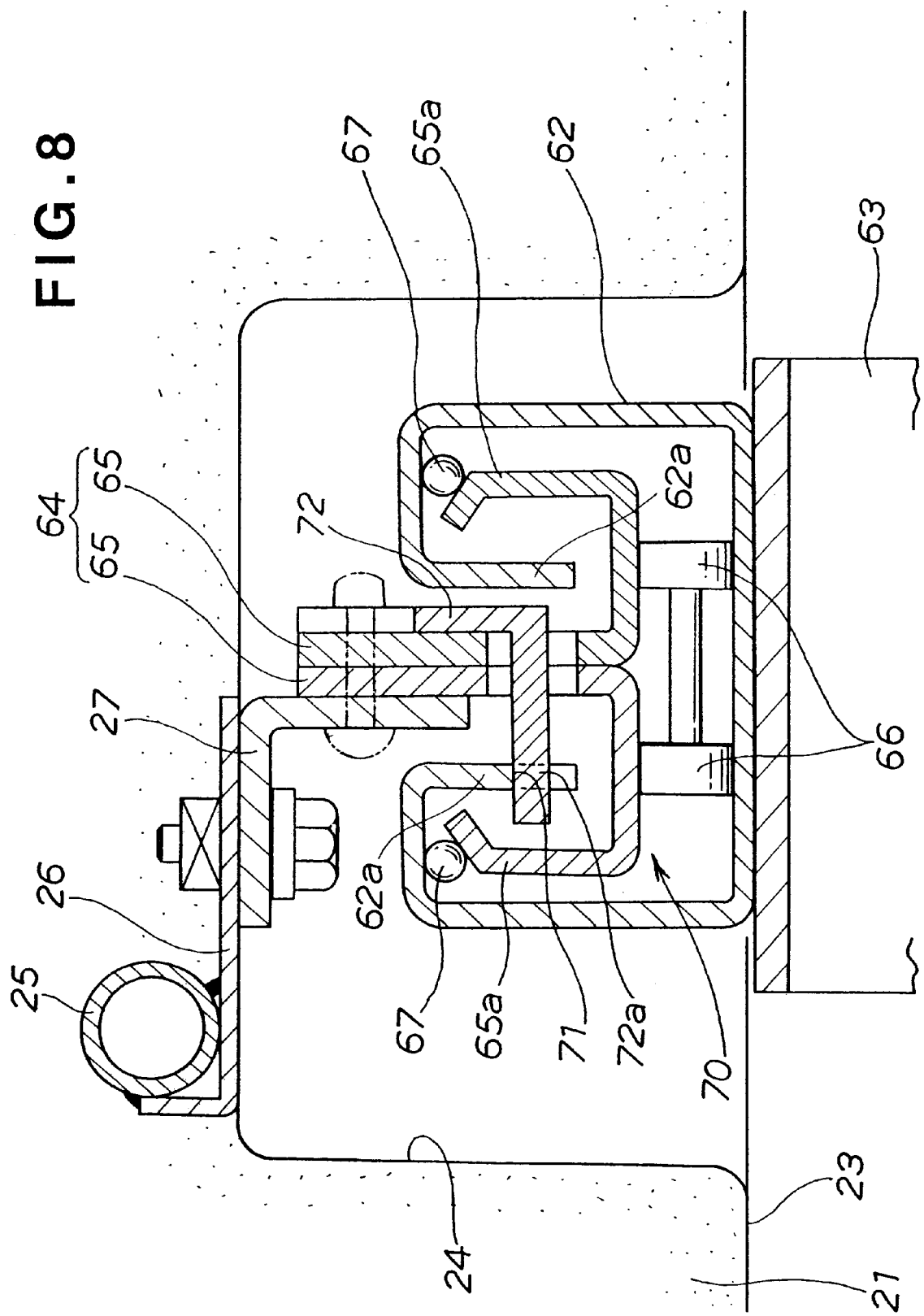
FIG. 8 is an enlarged sectional view showing the second sliding rail, second slider and second slide lock mechanism received in a underside recess of a seat base.

FIG. 8 is an enlarged sectional view showing the second sliding rail 62, second slider 64 and second slide lock mechanism 70 received in the underside recess 24 of the seat base 21. As seen in FIG. 8, the second sliding rail 62 has a generally channel-like sectional shape as with the above-described first sliding rail 31 of FIG. 5, and has a pair of inner lip portions 62a bend downward from an upper wall of the rail 62 and terminating halfway toward the bottom of the rail 62. The downwardly-opening second locking recesses 71 are formed in one of the inner lip portions 62a. The second slider 64 is composed of a pair of left and right elongate slide members 65 each extending in the front-and-rear direction of the vehicle and each having a J sectional shape, and these slide members 65 are attached together in back-to-back relation to each other. The slide members 65 of the second slider 64 each have a lower end portion inserted in the inner space of the channel-shaped second sliding rail 62. Each of the slide members 65 also has an outer lip portion 65a bent upwardly from the outer end of the bottom of the member 65 and terminating halfway up one of the lip portions 62a of the second sliding rail 62. The horizontal overlap between the lip portions 62a of the second sliding rail 62 and the lip portions 65a of the slide members 34 can prevent the second slider 64 from being accidentally slipped upward off the second sliding rail 62.

The second slider 64 has, at its bottom, a pair of left and right rollers 66 attached via a not-shown retainer. Load of the second slider 64 is supported by the bottom of the second sliding rail 62 via the left and right rollers 66. A plurality of balls 67 are rollably sandwiched between left and right side walls of the channel-shaped second sliding rail 62 and left and right bent-upward lip portions 65a of the second slider 64.

Stay 26 extends from a frame 25 of the seat base 21 (in this case, seat cushion frame) and is bolted to an upper portion of the second slider 64 via a bracket 27. In this way, the second slider 64 is fastened to the underside of the seat base 21. The lock claw 72a of the second lock arm 72 is caught in one of the second locking recesses 71 when the second slide lock mechanism 70 is in a normal locking state, but is disengaged from the second locking recess 71 as the second lock arm 72 is caused to pivot downward.

Figures 9A, 9B:
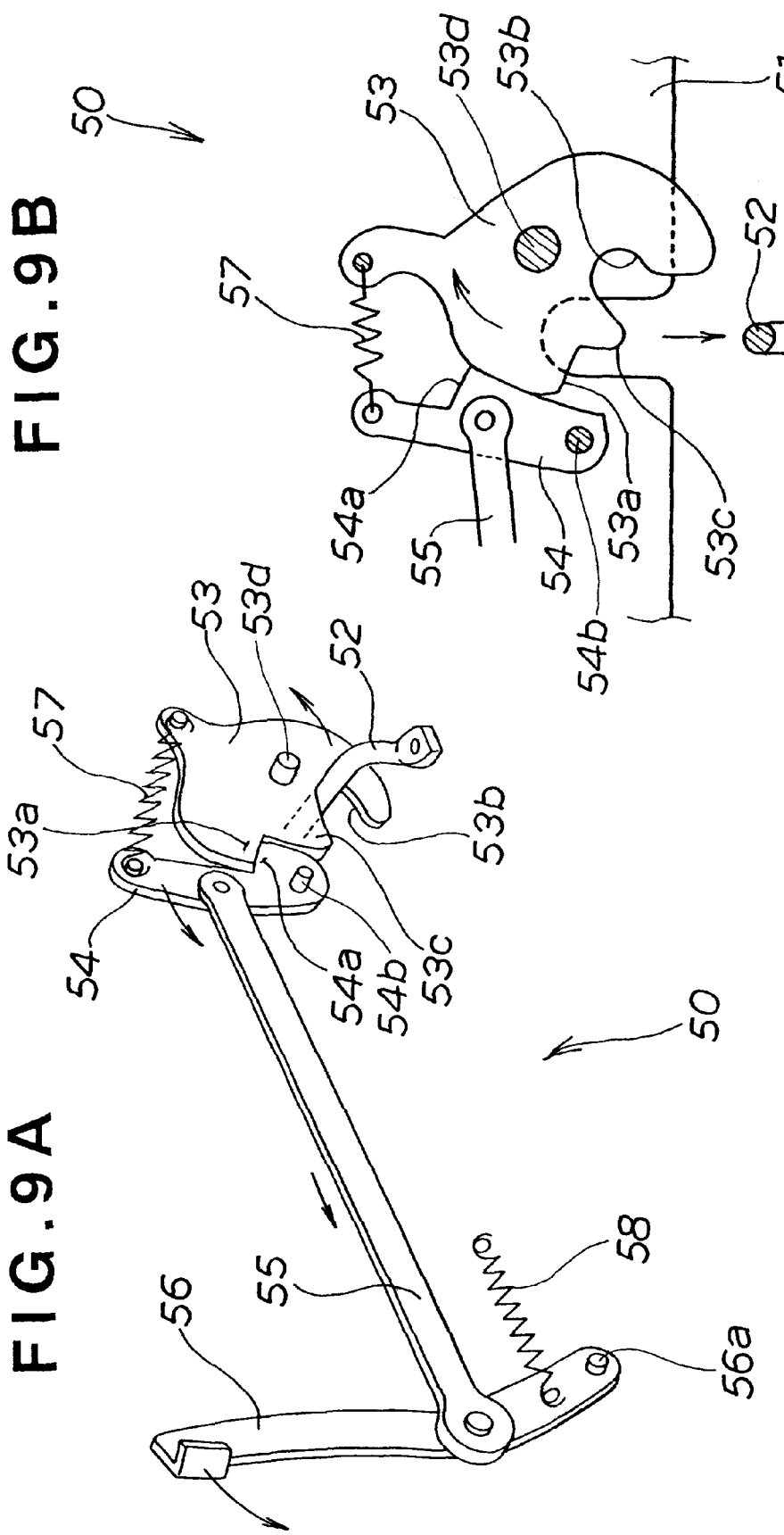
FIG. 9A is a perspective view showing the seat lock mechanism in the locking state.
FIG. 9B is a view showing the seat lock mechanism in the non-locking state.

FIG. 9A shows the seat lock mechanism 50 in the locking state, and more particularly shows how the seat lock mechanism 50 is shifted from the locking state to the non-locking state. As the seat-lock canceling lever 56 of the lock mechanism 50 in the locking state is turned about the horizontal pivot 56a in a counterclockwise direction as arrowed to thereby cause the link 55 to move in an arrowed direction, the lock member 54 is turned about the support pin 54b in a counterclockwise direction as arrowed, so that a locking projection 54a of the lock member 54 disengages from a catching projection 53a of the catcher 53 having so far been placed in meshing engagement with the locking projection 54a. Then, by the tension force of the catcher return spring 57, the catcher 53 is turned about the pivot 53d in the counterclockwise direction so that a catching recessed portion 53b disengages from the striker 52. As a result, the seat lock mechanism 50 is brought to an unlocking state.

FIG. 9B shows the seat lock mechanism 50 in the non-locking state, and more particularly shows how the seat lock mechanism 50 is shifted from the non-locking state to the locking state. When the catcher 53 is depressed along with the leg member 51 in an arrowed direction, a catching protrusion 53c abuts against the striker 52. The abutment causes the catcher 53 to turn in the clockwise direction as arrowed, against the tension force of the catcher return spring 57, until the catching recessed portion 53b engages the striker 52 and then the catching projection 53a meshes with the locking projection 54a of the lock member 54, which completes the shift from the non-locking state to the locking state of the seat lock mechanism 50.

Now, a description will be made about operation of the storable/slidable vehicular seat apparatus 10, with reference to FIGS. 2, 10 and 11. FIG. 10 shows the first slide lock mechanism 40, seat base 21 and second slide lock mechanism 70 in the locking state. In the illustrated example, the first and second sliders 32 and 64 are locked at the rearmost position on the respective sliding rails 31 and 62. As the slide-lock canceling lever 45 is turned in the clockwise direction as arrowed, the first cam 43 is turned in the counterclockwise direction as arrowed, so that the first lock arm 42 is caused to pivot downwardly in the clockwise direction. By such downward pivoting movement of the first lock arm 42, the claw 42a of the arm 42 disengages from the first locking recess 41 at the rearmost position.

The above-mentioned counterclockwise turn of the first cam 43 pulls the wire cable 48 in the forward direction, so that the second cam 73 provided in the seat 20 is turned in the clockwise direction by means of the wire cable 48, to thereby cause the second lock arm 72 to pivot downward in the clockwise direction. As a consequence, the claw 72a of the second arm 72 disengages from the second locking recess 71 at the rearmost position.

Namely, the first and second slide lock mechanisms 40 and 70 can be simultaneously shifted to the non-locking state by the manipulation of the single slide-lock canceling lever 45. If the seat base 21 is manually drawn by a human operator or passenger forward or rearward while the first and second slide lock mechanisms 40 and 70 are being shifted to the non-locking state by the manipulation of the slide-lock canceling lever 45, the seat base 21 can slide forward or rearward along the first and second sliding rails 31 and 62 via the first and second sliders 32 and 64. Then, once the human operator releases the slide-lock canceling lever 45, the first and second slide lock mechanisms 40 and 70 are returned to the locking state by the tension force of the individual return springs 46, 47 and 76, and thus the seat base 21 can be automatically fixed in position.

Namely, irrespective of whether the seat lock mechanism 50 is in the locking state or in the non-locking state, the first and second slide lock mechanisms 40 and 70 can be placed in the locking or non-locking state, and in the former state, the locking state of the slide lock mechanisms 40 and 70 can be maintained as desired.

Note that a distal end portion of the slide-lock canceling lever 45 projects into the upper depressed portion 38a of the pivot cover 38, only when the human operator inserts a hand in the upper depressed portion 38a of the pivot cover 38 to thereby positively or intentionally manipulate the slide-lock canceling lever 45, the locking state of the first and second slide lock mechanisms 40 and 70 can be canceled.

Figure 11:
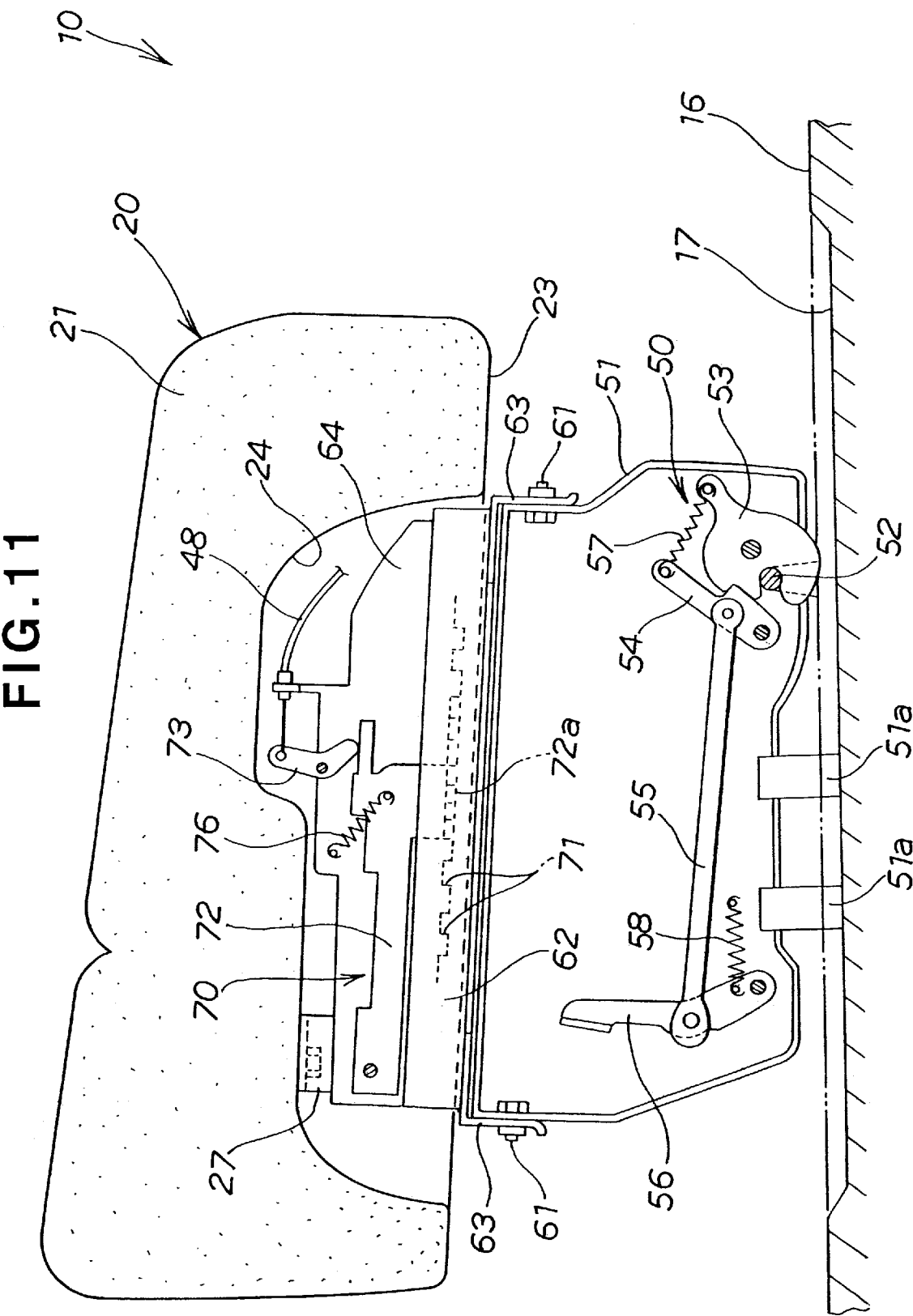
FIG. 11 is a view showing the seat base locked at a forward position on the second sliding rail.

FIG. 11 shows the second slider 64 and seat base 21 locked at the foremost position on the second sliding rail 62. When the seat base 21 is flipped upwardly to be stored against the wall 13, as denoted by the dot-and-dash line in FIG. 2, with the seat lock mechanism 50 in the non-locking state, the leg member 51, which is slidable relative to the seat base 21, is moved upwardly together with the seat base 21. At this time, the second slide lock mechanism 70, and the sliding mechanism (second sliding rail 62 and second slider 64) for causing the seat base 21 and leg member 51 to slide relative to each other are also moved upwardly together with the seat base 21 and leg member 51; thus, no sliding mechanism is left on the vehicle floor 16. Namely, after the flip-up of the seat base 21, only the striker 52 is left on the vehicle floor 16. Therefore, depressions and projections on the floor 16 can be eliminated or minimized, which allows the available space in the vehicle compartment 12 to be increased or maximized and also facilitates loading or unloading of goods into or from the vehicle compartment 12.

Because, in the present invention, the second sliding rail 62, second slider and second slide lock mechanism 70 are all received in the recess 24 formed in the underside 23 of the seat base 21, the second sliding rail 62, second slider and second slide lock mechanism 70 never project from the underside 23 of the seat base 21 into the vehicle compartment 12, so that the available space of the vehicle compartment 12 can be even further increased. Besides, the goods loaded in the vehicle compartment 12 will never hit any one of the second sliding rail 62, second slider and second slide lock mechanism 70.

According to the present invention, there is no possibility of the second slide lock mechanism 70 being accidentally moved forward or rearward by unintended force; that is, the second slide lock mechanism 70 can be actuated only when the slide-lock canceling lever 45 (see FIG. 10) is manipulated intentionally by the human operator or passenger. Similarly, there is no possibility of the leg member 51 being accidentally moved forward or rearward by unintended force. Because the position, in the front-and-rear direction, of the catcher 53 relative to the striker 52 is always fixed, the catcher 53 can be reliably locked relative to the striker 52.

Figure 12A:
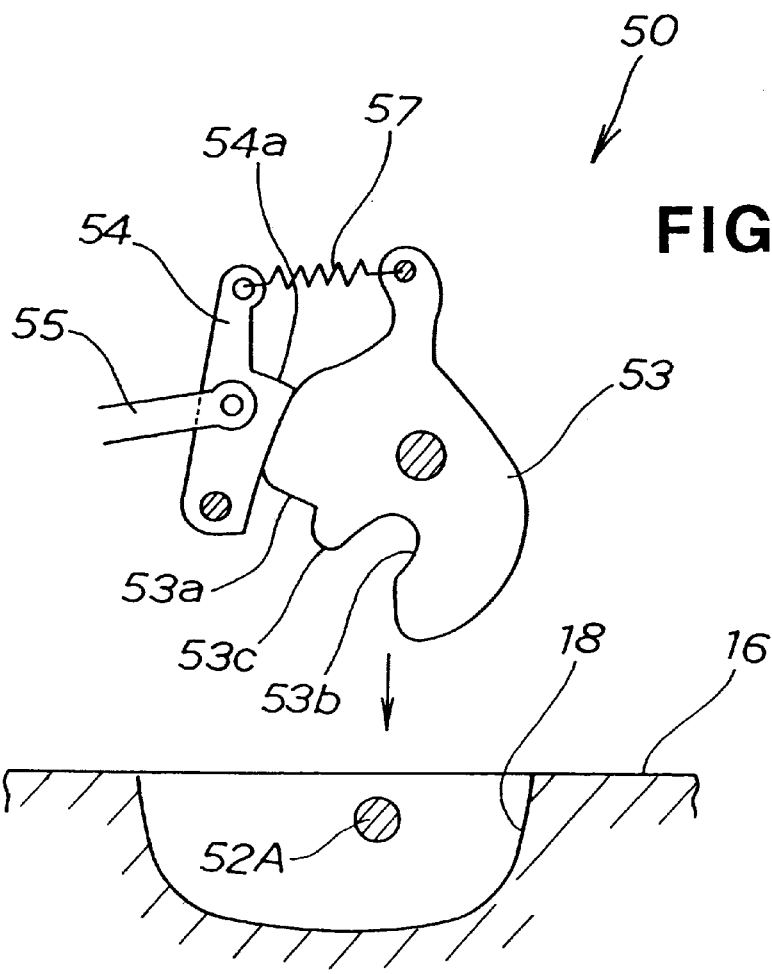
FIGS. 12A and 12B are views showing a modification of the seat lock mechanism of the present invention.
Figure 12B:
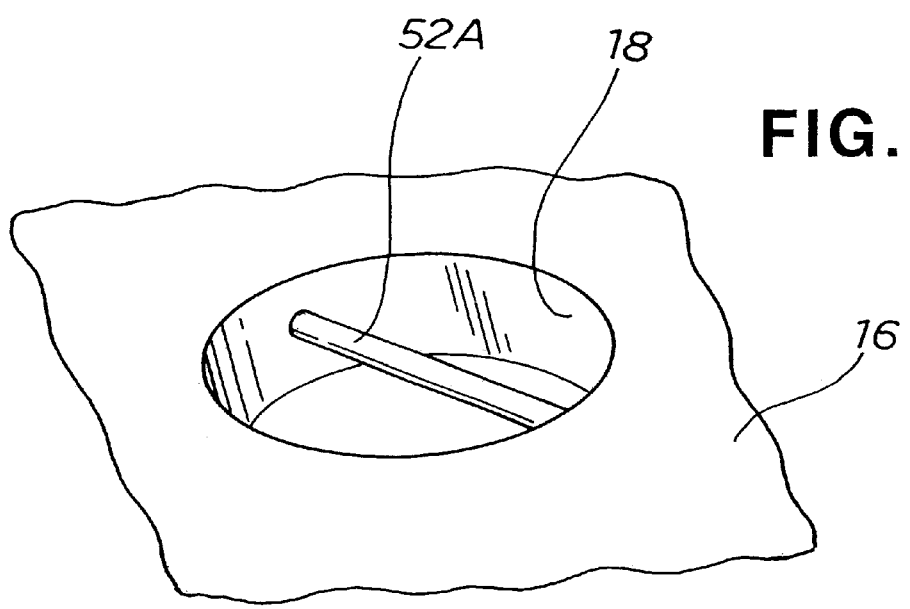

FIGS. 12A and 12B show a modification of the seat lock mechanism 50 shown in FIG. 11. The modified seat lock mechanism 50 is characterized in that it has an upwardly-opening recess 18 on the vehicle floor 16 and a rod-shaped striker 52A is provided within the recess 18. Thus, it is only necessary that the recess 18 have a size sufficient for allowing the catcher 53 engaging with or disengaging from the striker 52A in an appropriate manner. In this modification, the striker 52A does not project upward from the surface of the floor 16 into the vehicle compartment, and thus this arrangement also contributes to the elimination of obstructive depressions and projections on the floor 16. As a consequence, the striker 52A does not interfere with loading or unloading of goods into or from the vehicle compartment.

In the above-described embodiments, the seat lock mechanism 50 shown in FIG. 6 may include two sets of front and rear strikers 52 and catchers so that the seat is locked at the front and rear positions; this dual striker-catcher locking arrangement achieves stable locking. In such a case, the single seat-lock canceling lever 56 may of course be arranged to simultaneously unlock the two catchers.

Obviously, various minor changes and modifications of the present invention are possible in the light of the above teaching. It is therefore to be understood that within the scope of the appended claims, the invention may be practiced otherwise than as specifically described.

What is claimed is:

1. A storable/slidable seat apparatus for a vehicle comprising:
   a slide mechanism provided on a given portion of a vehicle bodywork proximate to a wall of the vehicle bodywork, said given portion being at a higher level than a central floor portion of the vehicle bodywork, said slide mechanism being slidable in a front-and-rear direction of the vehicle bodywork;
   a pivot mounted on said slide mechanism;
   a seat base slidable in the front-and-rear direction of the vehicle bodywork, said seat base being connected to said pivot so that said seat base can be pivotally flipped upwardly and stored against the wall via said pivot; and
   a leg member attached to an underside of said seat base, and extending downwardly from the underside of said seat base to support said seat base against the floor in such a way that said seat base is slidable relative to said leg member in the front-and-rear direction of the vehicle bodywork.

2. A storable/slidable seat apparatus as claimed in claim 1, wherein said seat base has a recess formed in the underside thereof, and wherein a sliding rail on which said seat base is slidable in the front-and-rear direction is received in said recess and said leg member is attached to said sliding rail.

3. A storable/slidable seat apparatus as claimed in claim 1, which further comprises a first slide lock mechanism for controlling sliding movement of said slide mechanism, a second slide lock mechanism for controlling sliding movement of said seat base relative to said leg member in the front-and-rear direction, a slide-lock canceling lever for canceling a locking state of said first and second slide lock mechanism, and a pivot cover covering said pivot and having a depressed portion, and wherein said slide-lock canceling lever is provided so that a distal end portion of said slide-lock canceling lever projects into the depressed portion of said pivot cover.

4. A storable/slidable seat apparatus as claimed in claim 1 wherein said seat base has, on the underside, a hook that lockingly engages with the wall when said seat base is in an upright stored position.

5. A storable/slidable seat apparatus as claimed in claim 1 wherein the floor of the vehicle bodywork has a recess, and which further comprises a striker provided at a position corresponding to the recess of the floor, and a seat lock mechanism attached to said leg member for engaging with said striker to lock said seat base.

6. A storable/slidable seat apparatus as claimed in claim 5 wherein said striker is received within the recess of the floor.

* * * * *